United States Patent [19]

Swift et al.

[11] Patent Number: 4,670,404
[45] Date of Patent: Jun. 2, 1987

[54] MICRO-SCALE CHEMICAL PROCESS SIMULATION METHODS AND APPARATUS USEFUL FOR DESIGN OF FULL SCALE PROCESSES, EMERGENCY RELIEF SYSTEMS AND ASSOCIATED EQUIPMENT

[75] Inventors: Ian Swift, Blue Springs, Mo.; Hans K. Fauske, Hinsdale, Ill.

[73] Assignee: Fike Corporation, Blue Springs, Mo.

[21] Appl. No.: 801,734

[22] Filed: Nov. 26, 1985

Related U.S. Application Data

[63] Continuation-in-part of Ser. No. 725,563, Apr. 22, 1985, abandoned.

[51] Int. Cl.$^4$ .................... G01N 25/20; G05B 9/00
[52] U.S. Cl. ..................................... 436/147; 374/33; 374/34; 422/51; 422/117; 422/130; 422/241; 422/208
[58] Field of Search ............... 422/129, 130, 199, 208, 422/51, 62, 241, 117, 118; 374/31-37; 364/500; 436/147, 55; 585/826

[56] References Cited

U.S. PATENT DOCUMENTS

| | | | |
|---|---|---|---|
| 3,160,447 | 12/1964 | Wasilewski | 422/51 |
| 3,210,996 | 10/1965 | Harwood et al. | 374/31 |
| 3,365,944 | 1/1968 | Hoagland et al. | 374/34 |
| 3,718,437 | 2/1973 | Paloniemi | 422/51 |
| 4,130,016 | 12/1978 | Walker | 436/147 |
| 4,209,490 | 6/1980 | Duncan et al. | 422/130 |
| 4,224,283 | 9/1980 | Potts | 436/101 |
| 4,235,841 | 11/1980 | Zimmerman | 422/208 |
| 4,362,537 | 12/1982 | Werner | 585/826 |

*Primary Examiner*—Michael S. Marcus
*Attorney, Agent, or Firm*—Schmidt, Johnson, Hovey & Williams

[57] ABSTRACT

Micro-scale chemical process simulation apparatus is disclosed which is useful for design of full-scale processes and associated equipment as well as emergency relief systems. A thin-walled vessel for receiving a quantity of the material to be evaluated is supportd within and thermally insulated from the walls of a surrounding containment unit. A guard heater is provided around the vessel and temperature thermocouples and pressure transducers are strategically located to monitor the temperature conditions existing in the material in the vessel as well as the pressure within the vessel and the containment unit respectively. Fluid may be selectively introduced into or exhausted from the containment unit to maintain a required pressure balance between the interior of the vessel and that of the containment unit. The wall thickness of the pilot vessel is such that the phi factor defined by the thermal mass of the material plus the thermal mass of the vessel divided by the thermal mass of the material is not significantly greater than the same ratio of thermal masses which obtain during a full-scale chemical operation in a pressure vessel.

56 Claims, 11 Drawing Figures

MICRO-SCALE CHEMICAL PROCESS SIMULATION METHODS AND APPARATUS USEFUL FOR DESIGN OF FULL SCALE PROCESSES, EMERGENCY RELIEF SYSTEMS AND ASSOCIATED EQUIPMENT

REFERENCE TO PRIOR APPLICATION

This application is a continuation-in-part of co-pending application Ser. No. 06/725,563, filed Apr. 22, 1985 entitled "Method and Apparatus for Measuring Adiabatic Self-Heat Rate of Exothermic Chemical Reactions and Determining Emergency Relief Vent Size", now abandoned.

BACKGROUND OF THE INVENTION

1. Field of the Invention

This invention relates to apparatus and processes facilitating design of full-scale chemical processes and associated equipment as well as emergency relief systems, and which may be carried out on a micro-scale basis in a manner that not only fully simulates the normal functioning and operating parameters of a full-scale process but also any overpressure conditions which can occur.

2. Description of the Prior Art

Many chemical processes are carried out in pressure vessels even though the process itself may be operated at minimal, atmospheric or subatmospheric pressures. The pressure vessel is designed and sized to accommodate specified overpressure conditions which may occur for a variety of reasons. Desirably, the pressure vessel used has emergency relief structure which will allow pressure which builds up in the vessel to be safely relieved therefrom before rupture of the vessel can occur.

Much effort has been expended in the past to predict the conditions that may occur in a chemical process carried out in a pressure vessel that will require pressure relief and to ascertain the vent structure that should be provided to handle such overpressure before catastrophic failure of the vessel can take place. In certain instances, the vent systems provided have been grossly oversized to avoid any possible problem in vessel rupture. This inherently increased the cost of the equipment but was felt necessary because of the recognition that the design was predicated primarily on estimates of possible overpressure conditions rather than reliable data. In other cases, vent systems have been inadequate to provide effective emergency relief because of inability of the process designers to accurately estimate the conditions that may actually arise under an overpressure situation.

The chemical process industry has also been plagued with problems of unscaling a specific process from laboratory equipment and test setups without the necessity of piloting the process through one or more incremental stages of increasing size. Typically, at least one pilot plant must be built and operated intermediate the lab simulation and a full-scale process. Even in these instances though, the pilot facility may not in all instances be an accurate test bed for what will occur in a full-scale chemical process, particularly from the standpoint of possible dangerous overpressure conditions where processing in pressure vessels is carried out. Furthermore, it has not heretofore been possible in many instances to determine whether or not chemical processes which take place with certain results at specific efficiency rates will operate in essentially the same fashion when carried out on a full-scale basis.

The difficulties of scaling up chemical processes from a procedure as well as equipment standpoint and of accurately determining what will occur under overpressure conditions have heretofore defied effective solution except through overdesigned equipment, or by carrying out tests and evaluations on a somewhat less than full-scale but substantial basis which is expensive, time-consuming and often impossible from a process and equipment standpoint to realistically duplicate.

Efforts to size emergency relief systems or to fully predict the operation of chemical processes on a pilot or test basis as compared with full-scale operation of a process have been particularly vexatious in connection with exothermic chemical processes which take place in closed reactor vessels. A number of conditions can lead to a runaway reaction and uncontrolled self-heating pressure build-up in the reactor vessel. Examples of such conditions include loss of cooling or refrigeration, contanimation of the reactor contents and overfilling with a critical reagent attributable to faulty instrumentation or erroneous control.

Overpressure conditions including those which occur as a result of a runaway exothermic reaction are principally controlled by the provision of an emergency relief system which operates to release the pressure in the vessel to a safe area at a threshold pressure value above the working pressure of the vessel but substantially below its rupture pressure. The rupture pressure often is set at a value approximately one-fourth that of the pressure which would result in catastrophic failure of the vessel. Typically, a relief system has a vent which opens at a predetermined pressure to allow flow of the reactor contents to appropriate treatment facilities which safely deal with the vented material. For example, if the gases or vapors are toxic or harmful, neutralization steps or gas scrubbers are employed to detoxify or neutralize the chemical agents before release to the atmosphere. If flammable vapors are involved, suitable flare systems or incinerators may be designed to prevent release or accomplish combustion or decomposition of the vapor flow.

Prior to the present invention, the traditional design of emergency relief systems and treatment facilities was based upon the assumption that only gases or vapors were required to be vented. This assumption, however, was seldom fulfilled when a runaway reaction caused a relief vent to open. In fact, what occurred was the venting of a frothy mixture of gas and liquid; i.e. a two-phase flow, which in the extreme involved the entire contents of the reactor vessel. As a result, for a given size relief vent, liquid being discharged filled a portion of the vent and effectively reduced the area available for the venting of vapor. Because less vapor than was assumed was vented per unit time, the pressure in the reactor vessel continued to rise potentially above the reactor vessel design limits. A second problem arose in that, because of the two-phase flow, the mass of the material being discharged was substantially greater than assumed for an all vapor flow. This higher mass flow often rendered any treatment facilities ineffective.

In order to establish an appropriate emergency relief system design, it was necessary to determine the adiabatic self-heat rate of the particular chemical reaction at the design relief pressure for the reactor vessel being used. Prior to the present invention, an accelerating rate calorimeter was used in estimating the self-heat rate. That equipment typically involved a test cell having a large heat capacity relative to that of the test sample. Because the test cell had a relatively high thermal mass, extrapolation of the test results to a full size process reactor was difficult, if not impossible, without detailed kinetics data on the chemical involved. Such data was generally not available on the runaway condition of interest in the design of an emergency relief system.

Similar independently variable factors were encountered in the sizing-up of laboratory developed processes to full-scale operations. The only available solution was to pilot the commercial installation, often done in successively greater incremental sizes to minimize the risks associated with design of an ultimately inefficient, unsafe or inoperable full-scale process.

SUMMARY OF THE INVENTION

The present apparatus and method permits effective simulation of full-scale chemical processes carried out in a pressure vessel or the like on a micro-scale basis, not only for the purpose of allowing sizing of emergency relief systems for chemical processes including runaway exothermic reactions, but also so that a full-scale process and the equipment required therefor may be designed without the necessity of going through one or more intermediate or pilot stages.

The apparatus and method of use hereof requires no input data concerning the nature or identities of the chemicals involved in the process or reaction other than that the vessel for receiving the material to be evaluated must be of a composition such that it will not be deleteriously attacked by the chemical agent(s) undergoing evaluation. For high pressure systems (i.e. reactions controlled by latent heat of vaporization) only a knowledge of the self-heat rate or rate of temperature rise corresponding to the set pressure of the relief device is required. Information as to chemical kinetics or physical property data is not needed.

An especially important feature of this invention is the fact that it permits evaluation of materials from the standpoint of design of emergency relief systems therefor as well as piloting of a full-scale process which may result in two-phase flow through a relief system or in the process itself. Other unique features include flow regime characterization to distinguish between foaming and non-foaming vessel behavior, as well as viscosity analysis to distinguish between laminar and turbulent flasshing flow especially under runaway exothermic process conditions.

A thin-walled vessel for receiving a quantity of the material to be evaluated is supported within and thermally insulated from the walls of a surrounding containment unit. A guard heater is provided around the vessel and temperature thermocouples and pressure transducers are strategically located to monitor the temperature conditions existing in the material in the vessel as well as the pressure within the vessel and the containment unit respectively. A fluid inert to the process may be selectively introduced into or exhausted from the containment unit to maintain a required pressure balance between the interior of the vessel and that of the containment unit. The wall thickness of the pilot vessel is such that the phi ($\Phi$) factor defined by the thermal mass of the material plus the thermal mass of the vessel divided by the thermal mass of the material is not significantly greater than the same ratio of thermal masses which obtain during a full-scale chemical operation in a pressure vessel.

When it is desired to determine the proper size of an emergency relief system, especially for runaway exothermic chemical reactions, the test vessel has a passage communicating with the surrounding containment unit and as the chemical reaction progresses, the pressure and temperature are monitored as a function of time to establish the self-heat rate of the reaction at a preselected pressure. The self-heat rate at the selected pressure is used with a vent sizing nomogram to establish the required vent area for a full size process vessel.

DETAILED DESCRIPTION OF THE INVENTION

1. Test Equipment Generally—FIG. 1

Figure 1:
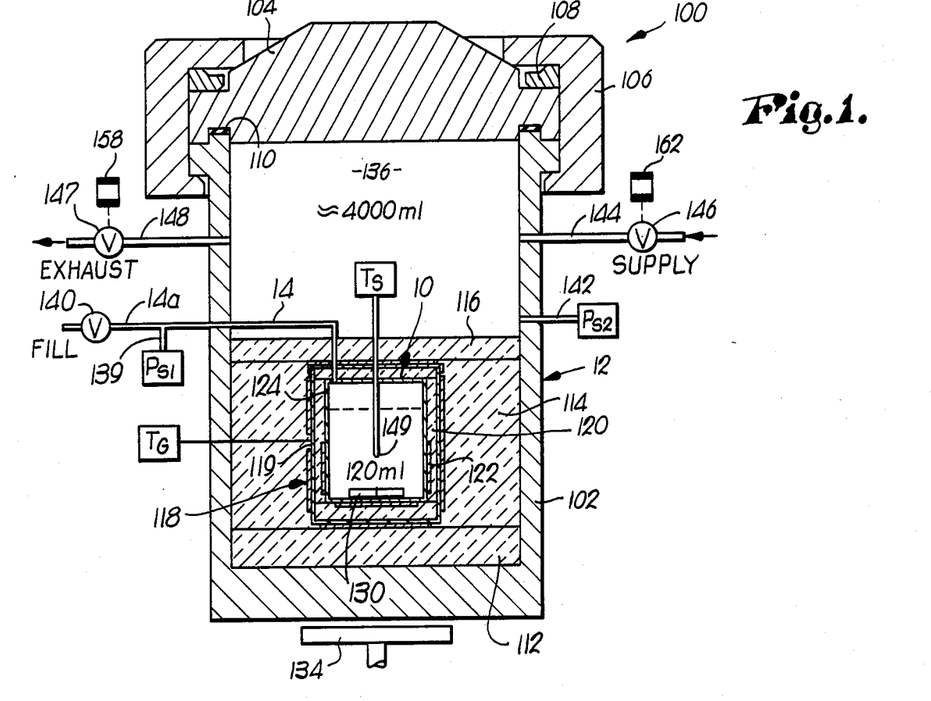
FIG. 1 is a schematic vertical cross-sectional view of equipment useful for determining on a micro-scale basis exothermicity and pressure generation during chemical reactions or pressure conditions which exist upon extraneously applied heat, or for piloting of full-scale chemical reactions or chemical process conditions to be carried out in pressure vessels.

The test equipment referred to generally by the numeral 10 in FIG. 1 is useful for pressure vessel emergency relief design, exothermicity determinations as well as pressure generation and temperature analyses which exist in pressure vessels during process operations, especially upon application of externally applied heat, or for micro-scale piloting of chemical processes.

Since the test vessel used for specific determinations varies from application to application, FIG. 1 illustrates the simplest test setup, i.e. where it is desired to analyze the thermal and pressure conditions which arise during a particular process or exothermic chemical reaction.

To this end, test vessel 10 removably disposed within the containment unit and generally denominated 12 is preferably made up of an open top, generally cylindrical, pressure confining, metal-walled container 102 which may be sealed with a top closure 104. A split band fastener 106 removably secures closure 104 over the top of container 102. O-rings 108 and 110 assure the pressure integrity of the container 102.

A disc of insulation material 112 lies on the bottom interior surface of container 102 while a cylindrical insulation section 114 which may for convenience be made up of two semi-cylindrical segments which mate in side-by-side relationship to define a cylindrical section rests on disc 112 and may be selectively removed from the container 102. An upper insulation disc 116 is supported on the upper cylindrical edge of the insulation section 114. A guard energy device in the nature of a heater 118 is located within the cylindrical opening of section 102 between discs 112 and 116 and has conventional resistance wires as component parts thereof wound about a metal container 119. The resistance wires may be selectively connected to a source of electrical current so that when energized, heat may be introduced into the interior of the containment unit 12 and especially the environment directly surrounding vessel 10.

Test vessel 10 is positionable within the guard heater 118 and is maintained in spaced relationship from the latter by a layer of insulation 120 which surrounds all sides of the vessel 10 as schematically shown in FIG. 1. An additional heater 122 in the form of resistance wires wound around the exterior of vessel 10 adjacent the lower portion of the cylindrical sidewall thereof, is provided to introduce heat into the interior of vessel 10 when it is necessary to do so, as for example, to initiate a reaction that then will proceed on an exothermic basis. Although not detailed in FIG. 1, it is to be understood that the insulation surrounding vessel 10 within guard heater 118 is segmental in nature and made up of a lower disc pad, strips or side sections and a top disc pad. Furthermore, although again not detailed in the schematic representation of FIG. 1, it is to be understood that the guard heater has a replaceable top which allows removal from and selective replacement of vessel 10 within guard heater 118 and thereby containment unit 10.

Figure 3:
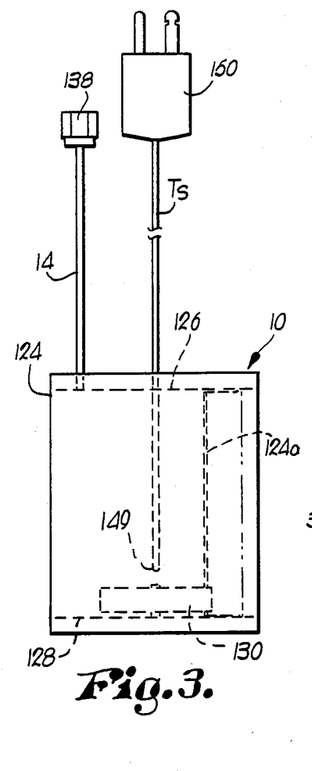
FIG. 3 is an enlarged schematic representation of the vessel as shown in FIG. 1 for receiving the material to be evaluated and better illustrated the form thereof where the interior of the vessel is closed from communication with the surrounding containment unit.

The vessel which is shown on a schematic basis in FIG. 1 is also illustrated schematically in FIG. 3. Vessel 10 has a cylindrical sidewall 124 closed at opposite ends by a top wall 126 and a bottom wall 128. Top wall 126 and bottom wall 128 are suitable affixed to sidewall 124 as by welding or equivalent means. Sidewall 124 may advantageously be fabricated from a sheet of metal material that when formed into cylindrical shape has an effective length greater than the circumference of the vessel 10 such that one end 124a of such sidewall overlaps the opposed end of such sheet and thereby extends into the interior of the fabricated vessel 10. This end 124a is transversely arcuate to form a convolute defining baffle within the interior of vessel 10. A metal stirrer bar or element 130 is rotatably positioned on the bottom of vessel 10 within the interior thereof and adapted to rotate about a transverse axis which extends through the non-magnetic ring 132 surrounding bar 130 intermediate the ends of the latter. Stirrer 130 is of ferromagnetic material such that it will be rotated during operation of the ferromagnetic driver 134 underlying the bottom 10a of containment unit 10. However, the stirring element 130 within vessel 10 is of such length that it clears the innermost upright edge of the arcuate baffle 124a. During rotation of stirrer element 130 by driver 134, the contents of vessel 10 are agitated and turbulent flow is induced by impingement of the material being evaluated against the arcuate face of baffle 124a.

An elongated tube 14 serving as a conduit communicates with the interior of vessel 10 through top wall 126 and extends through the cavity portion 136 of containment unit 10 to the exterior of the latter via the sidewall of container 102. A fitting 138 is provided on the end of tube 14 for joinder of the latter to a pressure transducer designated $P_{S1}$ via line 139 as shown in FIG. 1. Desirably, tube 14 is connected to a tubular fill element 14a having a control valve 140 therein for permitting material to be evaluated to be introduced into the interior of vessel 10 via tube 14 while at the same time effecting a pressure seal against leakage of fluid from the vessel. A second pressure transducer $P_{S2}$ permits reading of the interior pressure of cavity 136 of containment unit 12 through the line 142 schematically represented as extending through the sidewall of container 102.

A passage 144 communicating with the interior of containment unit 12 through the sidewall of container 102 has a valve 146 under the control of a solenoid 162 while another passage 148 also joined to containment unit 12 and communicating with the cavity 136 of container 102 has a valve 147 controlled by solenoid 158. Passage 144 may be used to introduce pressurized fluid, usually an inert gas such as nitrogen, into cavity 136 while passage 148 is useful to permit exhaustion of excess fluid from such cavity. Manifestly, passages 144 and 148 are shown in schematic form only and may consist of a single conduit connected to the containment unit 112 and provided with a three-way fluid control valve.

Thermocouple $T_S$ shown schematically in FIG. 1 and also illustrated somewhat diagrammatically in FIG. 3, has a tip 149 which terminates in the central portion of test vessel 10, as well as a connector 150 allowing the thermocouple to be joined to a suitable sensor. A second thrmocouple $T_G$ (FIG. 1) is joined to the metal wall 119 of guard heater 118 to provide a constant temperature reading of the temperature of such guard heater.

Figure 2:
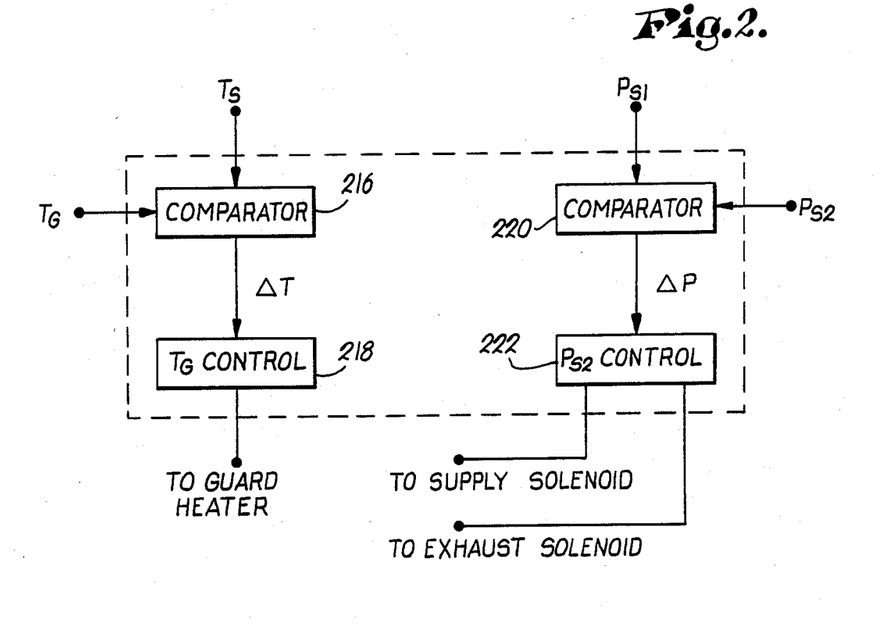
FIG. 2 is a simplified schematic diagram of certain parts of control circuitry that may be employed for one mode of operation of the equipment illustrated in FIG. 1.

In carrying out a thermal and pressure evaluation of material in accordance with the test setup of FIG. 1, a suitable microprocessor operated computer and control unit is connected to equipment 100 to provide the functions illustrated by the block diagram of FIG. 2. Thus, the thermocouples $T_S$ and $T_G$ are joined to a comparator circuit indicated by block 216 which in turn feeds a control circuit diagrammed as block 218. The control circuit 218 leads to guard heater 118 and controls energization of the latter. The pressure transducers $P_{S1}$ and $P_{S2}$ are coupled to a comparator circuit diagrammed as block 220 which, in turn, feeds a control circuit shown as block 222, that control selective operation of supply solenoid 162 and exhaust solenoid 158.

The test vessel is positioned within containment unit 12 in the location illustrated in FIG. 1 and accomplished by removing closure 104 and the disc 116, inserting the test vessel with the auxiliary heater 122 therearound in the central cavity of the containment unit 12 and in association with the surrounding insulation 120 and guard heater 118, returning insulation disc 116 to its initial position and then replacing the closure 104. The connector 138 of tube 14 is joined to conduit 14a which in turn is operably coupled to the pressure sensing line of pressure transducer $P_{S1}$. Thermocouple connector 150 and the connector of a thermocouple $T_G$ are joined to the sensing circuit leading to comparator section 216 of the computer.

The material to be evaluated for thermal and pressure conditions may be charged into test vessel 10 via line 14a upon opening of valve 140 and into the interior of test vessel 10 through line 14. Upon completion of introduction of material into test vessel 10, the interior of the vessel compartment may be sealed by closing valve 140. Power stirrer 134 is activated to effect rotation of stirrer element 130. Thereafter, operation of test equipment 100 is automatically under the control of the computer having preprogrammed as well as programmable microprocessors.

Assuming that the material introduced into vessel 10 (and which normally is of a volume assuming a level generally indicated by the dotted line 152 of FIG. 1) is of an exothermic nature and thereby reacts with evolution of heat, such reaction may be initiated if necessary by activation of the auxiliary heater 122 surrounding vessel 10.

In the preferred embodiment of the invention as shown in FIG. 1, vessel 10 desirably is of a size to provide an interior volume of only about 120 milliliters. Similarly, containment unit 12 is sized such that the cavity 136 defining free space above insulation 116 and below closure 104 has a volume of only about 4,000 milliliters.

Furthermore, the vessel 10 is constructed of material such that the thickness of the sidewall 124 is in the range of about 0.001 inch to about 0.006 inch, with best results being obtained when the wall thickness is about 0.001 inch to about 0.002 inch and better results being assured when the wall thickness is no more than about 0.003 inch. Although not absolutely essential, it is desirable that the top wall 126 and bottom wall 128 of vessel 10 be of the same thickness as sidewall 124. In any event, the top wall 126 and bottom wall 128 should have an effective thickness no greater than about 0.006 inch. Fabrication methods employed for producing vessel 10 for the most part dictate the relative thicknesses of top wall 126 and bottom wall 128 with respect to the sidewall 124. When a very thin sidewall 124 is employed, e.g., 0.001 inch to about 0.002 inch, it may be necessary to use a somewhat thicker metal for top wall 126 and/or bottom wall 128 to permit interconnection of the parts, as for example, by welding or the like. In the instance where vessel 10 having the absolute minimum wall thickness is sought, the walls and particularly sidewall 124 may be fabricated by electrodeposition of metal on a suitable supporting substrate which is then removed, or serves as a part of or all of the insulation 120 surrounding vessel 10.

Minimal wall thickness of vessel 10 is essential in obtaining the most reliable data from use of vessel 10. The wall thickness should be such that in solving the phi ($\Phi$) factor equation defined by the thermal mass of the charge of material in the interior of vessel 10 plus the thermal mass of the test vessel 10, divided by the thermal mass of the sample within the vessel 10, is not significantly greater than the same ratio of thermal masses calculated during full-scale pressure vessel operating and processing conditions which are being evaluated. Stated another way, the closer the phi ($\Phi$) factor is to 1.0 the better, with such factor desirably being maintained at all times within the range of about 1.03 to about 1.1.

Although the wall of the test vessel 10 is of very thin material and therefore has little strength against collapsing or rupture by pressure inside of the vessel, such factor is compensated for by the pressure equalization system which is provided to assure that the walls of the test vessel 10 see little, if any, pressure difference relative to their surroundings (or the test cell is open to the interior of containment unit 12 as hereinafter explained depending on the mode of operation).

In addition, the guard heater 118 supplies heat to the environment around the test vessel 10 in substantial surrounding relationship thereto thereby assuring that the walls of vessel 10 maintained at exactly the same temperature as the material being evaluated within the vessel. Thus the temperature of the vessel walls may be raised (or lowered as the case may be) as required to maintain an exact temperature balance between the wall of the vessel 10 and the test material. In this manner, there is no heat loss from the material to the surrounding atmosphere, or heat gain from the atmosphere in the instance where refrigeration or cooling apparatus is provided in surrounding relationship to the vessel (and normally located in association with the guard heater or as a replacement therefor) when the test equipment 100 is being employed to test a process where it may be necessary to remove heat from the vessel to a certain extent to simulate actual processing conditions.

2. Thermal and Pressure Condition Tests

Figure 8:
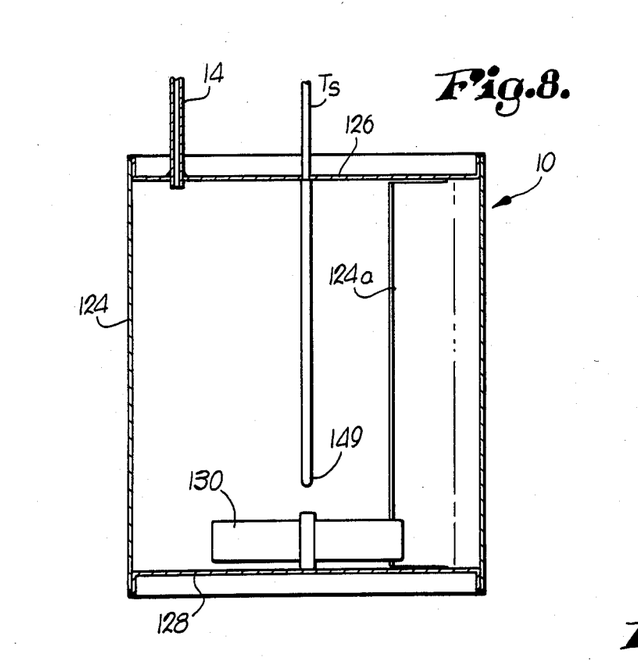
FIG. 8 is an enlarged schematic vertical cross-sectional view of the material-receiving vessel as illustrated in FIG. 3 and better showing the interior baffle which serves to induce turbulent material flow inside the test vessel.

In the use of test vessel 10 as depicted in FIGS. 1, 3 and 8 for conducting thermal and pressure condition tests for a particular reaction or chemical process to be carried out in a pressure vessel, and following charging of the material to be evaluated into the thin walled vessel, initiation of the chemical reaction, whether it be of an exothermic nature or endothermic characteristics, is commenced by energization of the auxiliary heater 122 surrounding the bottom part of the test vessel 10. Once a reaction has been initiated, or the chemical process to be evaluated commenced, the microprocessor control and readout computer which includes the program of the block diagram of FIG. 2 of the drawings, detects a temperature rise through the medium of thermocouple $T_S$ feeding comparator 216. Similarly, thermocouple $T_G$ feeds a signal to the comparator 216 so that the control system 218 of the computer maintains a minimum $\Delta T$ between the temperature sensed by the probe of thermocouple $T_S$ and the temperature of the guard heater 118 as sensed by thermocouple $T_G$. As previously indicated, the control 218 effects energization of the resistance coil of guard heater 118 as necessary to prevent a temperature differential from occurring between the material in vessel 10 and the metal body of guard heater 118. As a result, there is no significant net leakage of thermal energy from the material to the surrounding atmosphere. The guard heater therefore serves to functionally maintain the temperature of the guard heater wall at the same temperature as that measured by the thermocouple $T_S$ extending into vessel 10, at the rate of rise of the temperature of the material contained in vessel 10, whether or not such temperature rise occurs as a result of an exothermic reaction, increase in temperature of the material by virtue of heating thereof by the auxiliary heater, or any other process factor attributable to thermal energy input or evolvement, or pressure conditions. The comparator 216 and control 218 are programmed to assure that as the temperature of the sample of material in vessel 10 increases, the guard heater 118 is energized for a time period to assure that the temperature difference $\Delta T$ between the material in the vessel 10 and the guard heater 118 is essentially zero.

As the temperature of the test material in vessel 10 increases, the pressure in the test vessel will also increase. This may be attributable to either vapor pressure of the material sample or because of the production of an inert gas during a chemical reaction taking place in the vessel 10. As the pressure rises in the test vessel 10, such pressure is monitored by transducer $P_{S1}$ which responds to the pressure in tube 214 connected directly to the interior of test vessel 10.

The pressure in the interior of containment unit 12 is controlled by the comparator circuit 220 and $P_{S2}$ control system 222 of the computer to maintain the same pressure at all times in the interior of containment unit 12 as occurs within vessel 10 as sensed by transducer $P_{S1}$. When the pressure in test vessel 10 is greater than the presssure in the interior of containment unit 12, solenoid 162 is activated to open valve 146 and allow a fluid such as nitrogen or the like to be introduced into the cavity 136 of container 102. Solenoid 162 remains energized until such time as the comparator circuitry 220 determines that the P between the interior of vessel 10 and the cavity 136 of containment unit 12 is essentially zero. On the other hand though, if the pressure within vessel 10 as sensed by transducer $P_{S1}$ falls below the pressure within containment 12 as determined by transducer $P_{S2}$, then the control system 222 of the computer responding to the inputs thereto from the comparator system 220 energizes solenoid 158 to open valve 147 for a time period to re-establish the pressure balance between the interior of vessel 10 and that of containment unit 12.

The evaluation of material within vessel 10 continues until the temperature measured in the test sample of thermocouple $T_S$ reaches a maximum value and then starts to decline. This indicates completion of the exothermic reaction, or termination of the condition being studied. The temperatures and pressures that are measured during the test are retained in the memory of the computer and can be digitized with microprocessors in the computer and ultimately stored on a floppy disc for later retrieval and/or printout.

3. Flow Regime During Venting Evaluations

Figure 4:
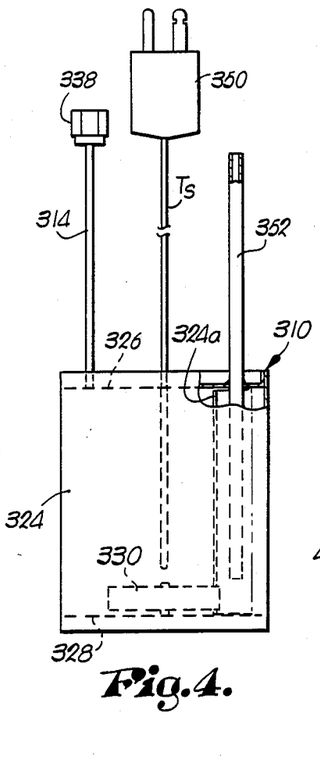
FIG. 4 is a schematic representation of another material-receiving vessel which may be used in the equipment depicted in FIG. 1 and illustrating the form of the test vessel where the interior of the vessel is in communication with surrounding containment unit through the provision of a tube of finite length and terminating near the bottom of the test vessel.

The test vessel 310 shown in FIG. 4 of the drawings is especially useful for determining the type of flow regime that will occur in a full-scale chemical process during venting of a pressure vessel.

Flow regime refers to whether the flow may be termed turbulent or laminar in the vent line and through the vent opening. If the flow is in the laminar regime, then the mass rate of discharge will be considerably less than if the flow was turbulent. As a result, it is essential to determine the type of flow that can be anticipated under particular processing conditions since this information is vital to not only sizing of the vent opening itself but the relief piping associated with such opening as well.

Viscosity of the material has an especially important influence on the type of flow that can be expected to occur in a particular process. For example, in certain process operations, the viscosity may change radically as a reaction proceeds, especially in the case of exothermic reactions. Polymerization reactions are exemplary in this respect, with a more viscous polymer resulting as the reaction proceeds.

Thus, the test procedure must be effective in determining the type of flow that will be experienced in full-scale processes. The present test equipment and method of operation thereof allows the vessel 310 to be substantially emptied of material being evaluated during a simulated runaway exothermic reaction, or heating of materials on a rapidly increasing basis and for the emptying to occur under conditions such that the parameters thereof are known and fully recorded for direct extrapolation to a full-scale process.

By measuring the time it takes for the material within vessel 310 to empty therefrom, the mass discharge rate of the material out of a vent for the vessel may be precisely determined. In order to accomplish this precise measurement, vessel 310 is provided with a vent line or tube 352 extending through the top wall 326 and terminating in spaced relationship from the bottom 328 of vessel 310. The line 352 has a minimum length of 100 millimeters. The exact diameter of line 352 is not critical; however, the length is of critical nature. The reason for such minimum length is to insure that equilibrium flashing flow occurs rather than non-equilibrium flow. If non-equilibrium flow were to occur, the resultant mass discharge rate would be considerably greater than that experienced during equilibrium flow, not only from test vessel 310 but also on a full-scale chemical process basis.

The other components of test vessel 310 are the same as shown and described with respect to vessel 10. Thus, a thermocouple $T_S$ is provided having a connector 350, while tube 314 communicating with the interior of the test vessel 310 has a connector 338 allowing coupling of the tube 314 to line 14a and line 139 leading to pressure transducer $P_{S1}$. Vessel 310 also has an internal stirrer element 330 and is provided with an interior curved baffle 324a.

The vessel 310 is inserted in the containment unit 12 in the same manner as previously discussed with thermocouple $T_S$ connector 350 being joined to a computer circuit and connector 338 is coupled to the material infeed line 14a and transducer $P_{S1}$ pressure feed line 139. The material to be evaluated for flow regime exhaustion from vessel 310 is charged to the latter via line 314 as described, or the material can be introduced into the test vessel 310 before the latter is inserted in the containment unit. After the material has been charged to vessel 310 and the interior sealed by closing of valve 140, a pressure is established in the interior of containment unit 12 which is equal to the design release pressure of an emergency relief system for a full-scale counterpart of that being evaluated through utilization of the test equipment 100 having vessel 310 mounted in containment unit 12. Such pressure is established by energization of solenoid 162 to open valve 146 for delivery of a fluid such as nitrogen under pressure into the interior of containment unit 12. Here again, comparator circuit 220 and pressure control system 222 may be employed to boost the pressure within the interior of containment unit 12 to a required preset value.

Next, a runaway chemical reaction is initiated within test vessel 310 or the material in such vessel is heated up by auxiliary heater 122 to raise the temperature of the material to an appropriate test level. The first test temperature level to be established may be termed the tempering point as read out by the comparator circuit 216 receiving an input from thermocouple $T_S$. At the tempering point of the material being evaluated, the boiling point of the test sample will essentially level out. In other words, the heat that is self-generated in the sample during an exothermic reaction or the heat that is added to the sample by the auxiliary heater 122 is converted into latent heat of vaporization. As a consequence, when the latent heat of vaporization is sufficient to cause tempering, the temperature of the system levels out.

Once the temperature levels out, the pressure in the containment unit 12 is increased to the allowable overpressure for a particular system. An allowable overpressure about 20% greater than set relief pressure is usual design practice. (The vent area versus overpressure curve is typically kneeshaped. To the left of the knee, the vent area increases rapidly as the overpressure goes to zero, while to the right of the knee, relatively small changes in the vent area result in large changes in the overpressure. As a rule of thumb, a 20% allowable overpressure avoids concerns relative to the unfavorable portion of the curve.)

Increase in pressure is accomplished by operation of solenoid 162 to open valve 146 and admit more high pressure fluid into the interior of containment unit 12 through line 144. Pressure transducer $P_{S2}$ allows accurate control over the pressure increase in containment unit 12. Upon increase of the pressure in the containment unit 12, the temperature of the material in test vessel 310 again increases as sensed by thermocouple $T_S$. When a tempering temperature is again reached as indicated by leveling off of such temperature, it is known that such tempering temperature has occurred at the allowable overpressure condition for the system design.

Once the second tempering temperature point has been obtained, the pressure in containment unit 12 is suddenly reduced down to atmospheric pressure as would be the case when a full-scale relief system functioned. This may be accomplished with test apparatus 100 and test vessel 310 by opening valve 147 under the control of solenoid 158. The result is an exact simulation of the opening of a relief device by sudden depressurization of a pressure vessel. Since the line or tube 352 extending into the interior of test vessel 310 communicates with the cavity 136 of container 102, the interior of test vessel 310 above the level of material therein is subject to the rapid pressure drop and as a result, the material within the test vessel flows outwardly through the long 100 millimeter line 352 to the interior of the containment unit. The time it takes to empty vessel 310 may be noted from the pressure curve that is measured and recorded by the comparator circuit 220 of the computer operably coupled to pressure transducer $P_{S1}$. By monitoring the pressure in the test vessel 310 during depressurization, a precise determination can be made as to how long it takes for the known quantity of material in test vessel 310 to flow out of such vessel into the cavity 136 of containment unit 12. Since the time required for the test material to flow out of test vessel 310 is accurately known and recorded, and the mass of the material exhausted from vessel 310 is known, the rate of discharge during the venting process may readily be determined by the computer. Thus, by comparing the measured mass rate of discharge with calculations based on homogenous flushing two-phase flow equations, the operator of test equipment 100 may readily, accurately, and quickly determine whether the material flow from vessel 310 was turbulent or laminar. If the flow measured equals or is very close to that which would have been predicted from a theoretical analysis of the system, then it can be correctly assumed that the flow must have been turbulent. However, if the flow measured and the calculations therefrom indicate that the rate is substantially less than what theoretical calculations would indicate, then it is known that the flow was laminar.

During the entire test described, it is to be understood that the temperature of the guard heater 118 is closely controlled by the comparator 216 and control system 218 of the computer to preclude any significant temperature differential between the material in vessel 310 and the temperature of the metal container 119 of the guard heater 118. This serves to prevent leakage of thermal energy to the surrounding atmosphere.

4. Relief Vent Sizing

Figure 5:
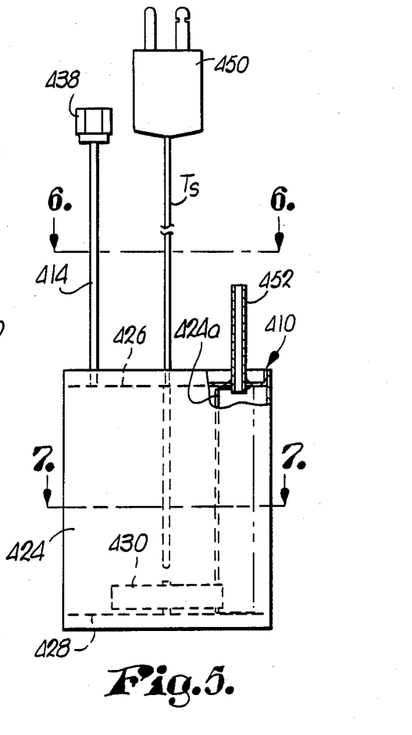
FIG. 5 is a schematic representation of another form of test vessel which may be used with the equipment as depicted in FIG. 1 and showing the form thereof wherein a short tube communicates the interior of the test vessel with the containment unit.
Figure 6:
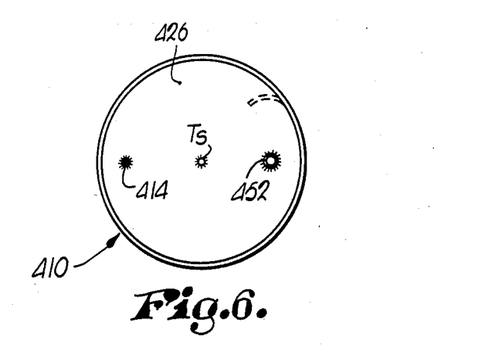
FIG. 6 is a horizontal cross-sectional view taken substantially along the line 6—6 of FIG. 5 and looking downwardly in the direction of the arrows.
Figure 7:
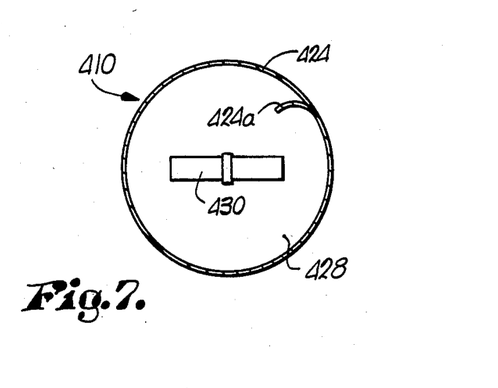
FIG. 7 is a horizontal cross-sectional view taken along the line 7—7 of FIG. 6 and again looking downwardly in the direction of the arrows.
Figure 9:
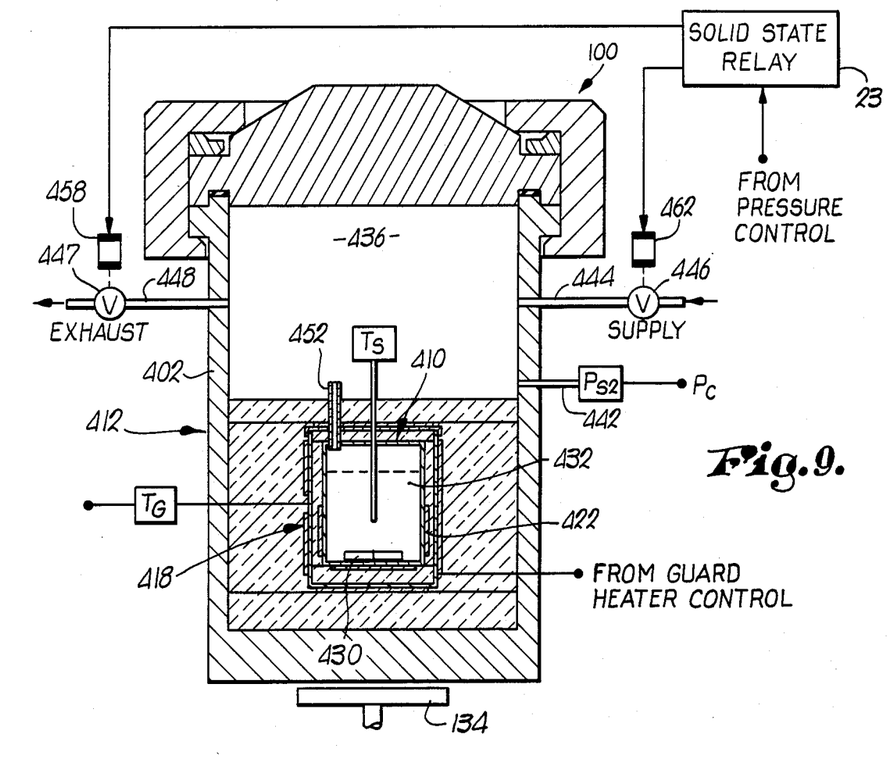
FIG. 9 is a schematic view similar to FIG. 1 but illustrating a test vessel as shown in FIG. 5 in the containment unit.

FIG. 5 of the drawings illustrates a test vessel 410 which is especially useful in equipment 100 for determining vent size openings that should be provided for both exothermic or endothermic reactions carried in process vessels on a full-scale basis. FIG. 9 illustrates vessel 410 in the interior of a containment unit 412 similar to the unit previously described. It is to be noted in this instance though, that the vessel 410 has a short tube or line 452 connected to and extending through the top wall 426 of such vessel. In this instance, the tube 452 is relatively short and does not extend to a point adjacent the bottom wall 428 of such vessel as was the case with long tube 352 of vessel 310. However, vessel 410 does have a temperature transducer $T_S$ provided with a connector 450 for joining such transducer to the computer circuit which is programmed to provide the functions block diagrammed in FIG. 10.

Similarly, vessel 410 has a filler tube 414 provided with a connector 438 with allows joinder of tube 414 to line 14a and the line 139 leading to pressure transducer $P_{S1}$. A stirrer element 430 is provided within the interior of vessel 410 while the interior transversely curved upright turbulent flow baffle 424a within the interior of vessel 410 is similar to the baffle as previously described.

In conductng the vent size requirement evaluation for a particular material and in accordance with pre-established processing conditions or reactions, vessel 410 is inserted in containment unit 412 in the same manner previously described and the charge of material 432 to be evaluated introduced into the interior of vessel 410, either before insertion of the vessel in the containment unit, or through the combination fill line and pressure sensing tube 414. It can be perceived from FIG. 9 that the interior of reactor vessel 410 is open via tube 452 to the containment unit 412. Similarly, pressure transducer $T_S$ provides a continuous readout of the temperature of the material sample 432 while pressure transducer $P_{S2}$ provides a continuous readout of the pressure within cavity 436 of container 402 via line 442. Introduction of pressurized fluid such as nitrogen into the interior of container 402 through line 444 is under the control of valve 446 operated by solenoid 462 while exhaustion of pressurized fluid from the interior of containment unit 12 is accomplished via line 448 with the valve 447 therein being controlled by solenoid 458. Solenoids 458 and 462 are actuated by the computer circuitry which includes solid state relay functions designated 23 which receive inputs from pressure control system 42.

In order to determine the appropriate size of an emergency relief vent, empirical determinations have confirmed the validity of a number of important assumptions.

First, the material entering the vent line at the peak venting requirement is assumed to be a homogeneous liquid-gas mixture under an equilibrium condition flowing in the turbulent regime. Second, the total pressure in the vessel for which an emergency relief vent is to be designed is assumed to be only the system vapor pressure. Third, a modest (i.e. 10–30%) overpressure above the actual set relief pressure for the vessel in question is assumed to be permissible.

Based upon the foregoing assumptions, the area (A) of an emergency relief vent for a particular pressure vessel may be represented by the following equation:

$$A = \frac{V\rho}{G\Delta t_v} \quad (1)$$

where V is the reactor volume, $\rho$ is the density of the material to be evaluated, and G is the flashing critical flow rate which may be indicated by the formula:

$$G \sim \frac{\Delta P}{\Delta T}\left(\frac{T}{C}\right)^{\frac{1}{2}} \quad (2)$$

where $\Delta T$ is the temperature rise resulting from the overpressure, $\Delta P$. T is the temperature, C is the specific heat of the material being evaluated, and $\Delta t_v$ is the venting time given by the formula:

$$\Delta t_v \sim \frac{\Delta TC}{q_s} \quad (3)$$

where $q_s$ is the energy release rate at the set pressure of the relief system. By combining equations (1) and (3), the vent area may be expressed as:

$$A = V\rho(TC)^{-\frac{1}{2}}\frac{q_s}{\Delta P} \quad (4)$$

Figure 10:
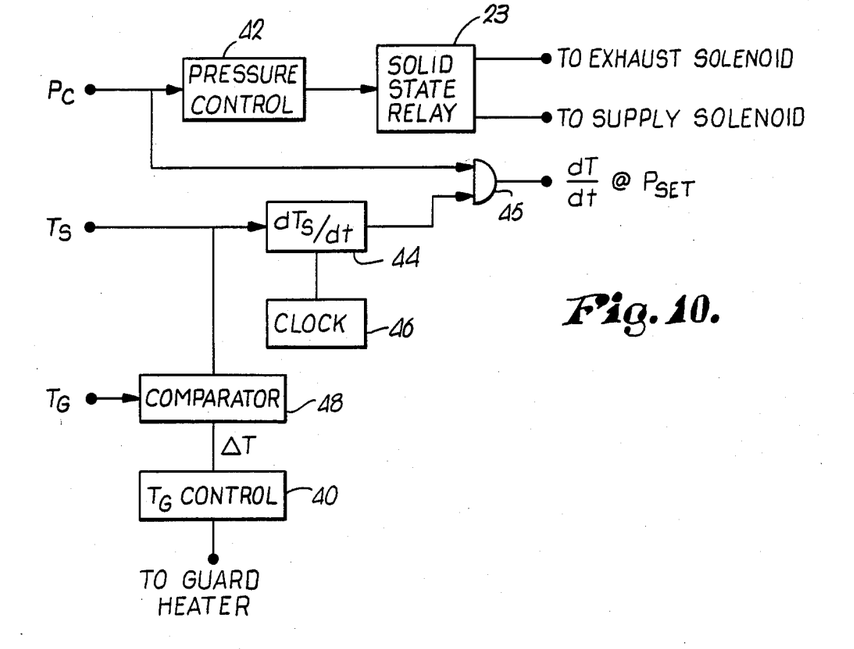
FIG. 10 is a schematic block diagram of central components useful in an evaluation of a reaction to determine the proper sizing of an emergency relief system vent.
Figure 11:
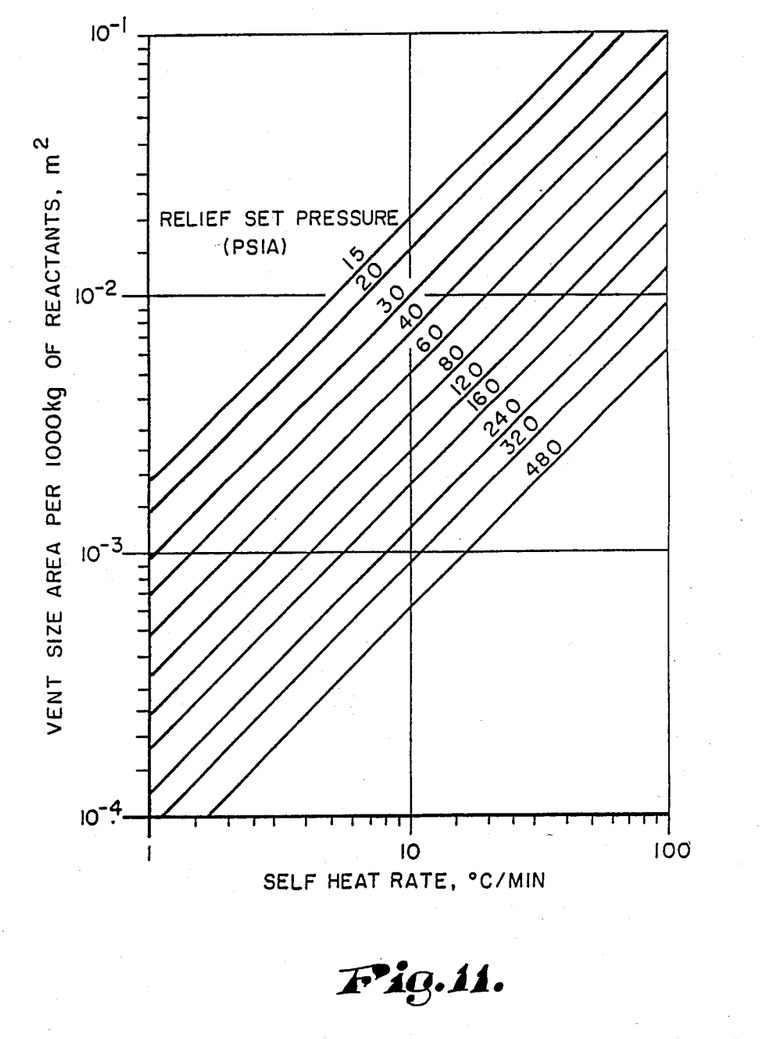
FIG. 11 is a nomogram for use in determining emergency relief system vent size as a function of the self-heat rate of the reaction at a preselected relief pressure.

Equation (4) may be employed to develop the nomogram of FIG. 10 which is usable to determine the required vent size area required per unit weight of material in a pressure vessel with a predetermined relief set pressure. The only required input information is the heating rate of the material in the test vessel which is to be accommodated by the full-scale pressure vessel and its emergency relief system. In the case of an exothermic chemical reaction, this would be the adiabatic self-heat rate of the chemical constituents.

Initially, the pressure in containment unit 412 is set to correspond to a predetermined back pressure $P_C$ that is established for a full-scale process. The pressure in the interior of vessel 410 is the same above the level of sample 432 therein because of the intercommunication of the vessel 410 with cavity 436 via tube 452.

The next step is to initiate the runaway chemical reaction or heating of the material if an endothermic process is involved by suitable actuation of the auxiliary heater 422 surrounding vessel 410. If an exothermic reaction is being evaluated, and the computer ascertains that the material itself is evolving thermal energy as sensed by thermocouple $T_S$, auxiliary heater 422 is turned off. The guard heater 418 controlled by the system 40 of the computer is energized as required to maintain the temperature of the guard heater equal to the temperature inside test vessel 410. As the temperature increases inside of vessel 410 as determined by thermocouple $T_S$, a tempering point will eventually be reached where the temperature of the sample $T_M$ stabilizes at the boiling or stripping point. Instead of the temperature continuing to rise, the temperature will level out. At this point, all of the heat generated in the runaway reaction or introduction of heat from the external source such as auxiliary heater 122, is converted into latent heat. When the material in test vessel 410 reaches a constant temperature and remains level, it will stay at that temperature until the system pressure is altered.

Following tempering or temperature stabilization, the pressure in containment unit 412 is rapidly increased by means of pressure control circuitry 42 associated with solid state relay 23. The pressure $P_C$ is increased to a higher point $P_C$, sufficient to suppress the boiling or stripping effect such that the adiabatic rate of temperature rise may be measured, i.e. the chemical energy release equals the sensible heat of the liquid. The temperature of the material sample 432 is constantly monitored by the thermocouple $T_S$ coupled to a differentiator 44 also having an input from a clock 46. The output of the differentiator 44 is the time derivative, $dT_s/dt$, of the sample temperature. In order to assure long term tempering of the reaction, the pressure in containment unit 412, $P_C$, is then brought back down to the desired overpressure at which the emergency relief system is to operate. The pressure monitor signal $P_C$, together with the output of the differentiator 44 is applied to an AND gate 45, the output of which represents the adiabatic self-heat rate of the reaction at the design relief pressure as the reaction goes to completion. The signals representing the sample temperature as sensed $T_{S1}$, and the guard heater temperature, $T_{G1}$, are sent to a comparator 48, the output of which represents the difference $\Delta T$, between the two. The $\Delta T$ signal is coupled to the guard heater control 40 which in turn adjusts the guard heater temperature to zero out the $\Delta T$ signal. The guard heater temperature is thus adjusted to substantially eliminate heat losses from the reaction vessel.

After pressure reduction, if no further increase in the sample temperature, $T_{S1}$, is observed, the design of the emergency relief vent can be safely based upon the measured self-heat rate. However, should a second exotherm appear, the above procedure is again repeated to establish the most stringent venting requirements.

Once the adiabatic self-heat rate is established, the vent size area for the emergency relief system is determined through the use of the nomogram of FIG. 10. By way of example, in 1978, a serious chloroprene runaway reaction accident caused a 2,000 gallon tank containing about 5,400 kilograms of the monomer to explode. The tank was equipped with a 4 inch diameter 75 psig safety disc and the adiabatic self-heat rate has been determined to be approximately 15° C. per minute. For these conditions, use of the present evaluation equipment and procedure suggests a vent area of $4.8 \times 10^{-3}$ square meter per 1,000 kilograms of reactants. This translates into an 8 inch diameter safety disc being required for effective relief of the chloroprene runaway reaction.

5. Full-Scale Process Simulation or Modeling

Equipment 100 through the provision of the different types of thin walled test vessels for use in association therewith permits simulation of full-scale processes on a micro basis without the necessity of intermediate pilot processes. Not only may the process itself be thoroughly evaluated and analyzed for direct extrapolation from the microscale tests to full-scale processing, but equally as importantly, the material itself may be tested for composition and physical characteristics at any desired point in the process.

For example, by provision of the filler tube 14 (314 and 414), it is possible to not only charge the material to be evaluated into the test vessel while it is contained in the unit 12, but equally as importantly, samples of the material may be withdrawn from the vessel at will during the test reaction or material heating for chemical analysis or physical study and characterization. Furthermore, the reaction or heating of material in the test vessel may be closely controlled without loss of heat to the surroundings. In addition, studies may be conducted of the flow that occurs upon release of pressure from the reactants or material being tested.

The effectiveness of the present equipment and method for process simulation and modeling is attributable not only to the manner in which the temperature and pressure conditions which exist on a historical basis may be accurately monitored and recorded for subsequent evaluation, but equally as importantly, the use of a thin walled test vessel which maintains a phi ($\Phi$) factor of approximately 1 at all times does not result in loss of thermal energy from the equipment by virtue of maintenance of the guard heater and the material at essentially the same temperatures at all times. However, utilization of a thin walled test vessel is feasible by virtue of the unique manner in which the pressure imposed on the vessel is equalized or controlled in such fashion that the walls of the vessels do not collapse.

Another important feature of the present invention is the fact that the test vessels are relatively inexpensive and of small size thus making the overall cost of the equipment and use thereof economically attractive and available for widespread usage in the chemical processing industry where accurately sized relief vents are an absolute necessity from a process and safety standpoint.

What is claimed is:

1. Test equipment for pressure vessel emergency relief system design, useful to determine exothermicity and pressure generation during chemical reactions or pressure conditions which exist upon extraneously applied heat, comprising:

a containment unit having an interior surface;

a test vessel within the containment unit and having a thin-walled container, with side and bottom walls, for receiving a sample of the material to be evaluated, said vessel being spaced from the interior surface of the containment unit;

a guard energy device within the containment unit physically and thermally spaced from the test vessel and the interior surface of the containment unit respectively for controlling the temperature of the environment immediately surrounding the test vessel;

insulating means between the guard energy device and the test vessel;

means for monitoring the temperature conditions existing in the material in the test vessel;

means for monitoring the pressure conditions existing within the vessel and the containment unit respectively;

means for introducing fluid into or exhausting fluid from the containment unit;

means for comparing the monitored pressures for controlling introduction or exhaustion of fluid from the containment unit as necessary to maintain substantially isobaric pressure conditions in the test vessel and the containment unit; and means responsive to the monitored temperature conditions and operably connected to the guard energy device for selectively controlling operation thereof to maintain the temperature of the environment around the test vessel at a value relative to the sensed temperature of the material in said test vessel such that significant heat loss from the material to the environment immediately surrounding the vessel is prevented, the thermal mass of the test vessel being such that the phi factor defined by the thermal mass of the sample of material plus the thermal mass of the test vessel divided by the thermal mass of the sample is not significantly greater than about 1.1.

2. Test equipment as set forth in claim 1, wherein the wall thickness of the container of the test vessel is such that the phi factor is in the range of about 1.03 to about 1.1.

3. Test equipment as set forth in claim 1, wherein thermal insulation means is provided between the interior surface of the containment unit and the test vessel.

4. Test equipment as set forth in claim 3, wherein secondary heating means is provided in at least partial surrounding relationship to the test vessel and operable independently of the guard energy device.

5. Test equipment as set forth in claim 1, wherein the walls of the container of said test vessel are closed against communication with the interior of the containment unit.

6. Test equipment as set forth in claim 1, wherein the thickness of said walls is no more than about 0.006 inches.

7. Test equipment as set forth in claim 1, wherein the thickness of said walls is no more than about 0.003 inches.

8. Test equipment as set forth in claim 1, wherein the thickness of said walls is no more than about 0.001 to about 0.002 inches.

9. The test equipment of claim 1, further including thermocouple means extending into the container and located to measure the temperature of the material substantially at the central portion thereof.

10. The test equipment of claim 3, further including thermocouple means located to measure the temperature of the guard heater means.

11. The test equipment of claim 5, wherein a conduit is provided in communication with the container of the test vessel and extends into the container in spaced relationship to the bottom wall thereof, said conduit extending through the containment unit and terminating externally of the latter, there being first pressure transducer means connected to said conduit for measuring the fluid pressure therein.

12. The test equipment of claim 11, further including second pressure transducer means operable to measure the pressure within the containment unit exteriorly of said container of the test vessel.

13. The test equipment of claim 12, further including control means operably associated with said first and second pressure transducer means and responsive to the latter for supplying sufficient fluid to the containment unit to maintain substantially isobaric pressure conditions in the container of the test vessel and the containment unit.

14. Test equipment as set forth in claim 1, wherein said container of the test vessel is of substantially cylindrical configuration.

15. Test equipment as set forth in claim 14, wherein said sidewall is cylindrical in shape and has opposed end walls, one of which is said bottom wall, welded to respective extremities of the sidewall.

16. Test equipment as set forth in claim 14, wherein said sidewall is cylindrical and is provided with an internal, longitudinally-extending transversely arcuate baffle projecting from an inner surface of the sidewall and defining a portion of a convolute.

17. Test equipment as set forth in claim 14, wherein said containment unit is of generally cylindrical configuration with the vessel substantially coaxial therewith, there being free space within the containment unit above the thermal insulation serving as a fluid chamber for introduction of fluid or exhaustion of fluid therefrom.

18. Test equipment as set forth in claim 1, wherein said container of the test vessel is provided with a tube therein communicating an interior of the container with the interior of the containment unit.

19. Test equipment as set forth in claim 18, wherein said tube extends into the container of the test vessel for a substantial portion of the effective length of the latter.

20. Test equipment as set forth in claim 19, wherein said container of the test vessel is of greater length than width and the tube extends into the container a distance greater than the effective width of the container.

21. Test equipment as set forth in claim 18, wherein said container of the test vessel is of generally cylindrical configuration, the tube is parallel with an axis of the test vessel and extends from the containment unit to a point in closer proximity to an end of the vessel remote from an area of communication of the tube with the containment unit than an opposite end of such vessel.

22. Test equipment as set forth in claim 18, wherein said tube in the container of the test vessel is approximately 100 millimeters in length.

23. Test equipment as set forth in claim 1, wherein said container of the test vessel is of a size providing an interior volume of approximately 120 milliliters.

24. The test equipment of claim 1, further including means permitting introduction of material to be evaluated into the container of the test vessel while evaluation of the material is being carried out therein.

25. Test equipment as set forth in claim 24, wherein said means permitting introduction of material into the container of the test vessel is a tubular element extending through the containment unit and communicating directly with the container of the test vessel.

26. Test equipment as set forth in claim 25, wherein said tubular element is provided with valve means permitting selective sealing and opening of the tubular element for intermittent introduction of material into the container of the test vessel.

27. The test equipment of claim 1, further including means in the container of the test vessel for agitating the material therein as evaluation of the latter is carried out.

28. Test equipment as set forth in claim 27, wherein said agitating means comprises a stirrer of a ferromagnetic substance, there being a power-driven ferromagnetic member in sufficiently close relationship to the stirrer to effect selective movement thereof.

29. A method for pressure vessel emergency relief system design, useful to determine exothermicity and pressure generation during chemical reactions or pressure conditions which exist upon extraneously applied heat, comprising the steps of:
confining a sample of the material to be evaluated on a micro-scale in a test vessel;
positioning the confined sample of material in said vessel in a containment zone;
monitoring the temperature conditions existing in the material within said vessel;
monitoring the pressure conditions existing within the vessel and the containment zone;
introducing fluid or exhausting fluid from the containment zone in response to the monitored pressure conditions as necessary to substantially maintain isobaric pressure conditions on the material within the vessel and in the containment zone;
providing a source of guard heat within the containment zone physically and thermally spaced from the test vessel for controlling the temperature of the environment immediately surrounding the test vessel;
providing thermal insulation between the source of guard heat and the test vessel;
selectively maintaining the temperature of the environment immediately surrounding the vessel at a value relative to the temperature of the material in the vessel such that heat loss from the material to the environment surrounding the vessel is substantially prevented; and
maintaining a phi factor defined by the thermal mass of the sample of material plus the thermal mass of the confinement vessel divided by the thermal mass of the sample at a value not significantly greater than about 1.1.

30. A method as set forth in claim 29, further including: communicating the interior of the test vessel with the containment zone, said passage having a length sufficient to cause equilibrium flashing critical flow of the material from the vessel to the containment zone upon depressurization of the containment zone with respect to the vessel.

31. The method of claim 30, further including the step of monitoring a pressurization rate of the test vessel that occurs upon depressurization of the containment zone.

32. The method of claim 31 further including, determining if the flow regime of material from the test vessel to the containment zone via said passage is turbulent flow or laminar flow by causing the pressure within the test vessel to reach a level no greater than about that of a preselected maximum allowable working pressure of the full-scale pressure vessel being evaluated, and then determining the time required to essentially empty the test vessel of its contents upon depressurization of the containment zone and comparing such time with a calculated time based on turbulent two-phase equilibrium flashing critical flow for said material.

33. The method of claim 29 further including, determining on a micro-scale the vent area requirements for a full-scale pressure vessel containing exothermic reactant materials wherein is included the steps of introducing into the test vessel a quantity of material capable of undergoing an exothermic reaction, imposing pressure on the material in the test vessel no greater than about that of a preselected maximum allowable working pressure of the full-scale pressure vessel being evaluated, providing conditions effecting initiation of the exothermic reaction under said pressure and allowing such reaction to continue until the temperature of the material essentially reaches its boiling point, ascertaining the temperature of the material when it essentially reaches its first boiling point, increasing the pressure in the containment zone to a level equivalent to a selected allowable overpressure for the full-scale pressure vessel, then again ascertaining the temperature of the material in the test vessel when it again essentially reaches its second boiling point at the increased pressure thereon, determining the rate at which the temperature rises from its first boiling point to its second boiling point, and providing a relief opening in the full-scale pressure vessel which responds to the formula $$A = \frac{V\rho}{\Delta P} \frac{dT}{dt} \frac{T}{C} - 1$$

where A equals the area of the relief opening required, V is the volume of the full-scale pressure vessel, $\rho$ is the density of the reactants in the vessel, $\Delta P$ is the selected allowable overpressure for the full-scale pressure vessel, T is the average temperature between the first and second boiling points, C is the specific heat of the reactants in the test vessel, dT/dt is the rate of temperature rise which is found to occur at said first boiling point.

34. The method of claim 29, further including the step of introducing additional material into the test vessel during the period of evaluation thereof for simulating full-scale processing conditions.

35. The method of claim 29, further including the step of removing material from the test vessel during the period of evaluation thereof for simulating full-scale processing conditions.

36. The method of claim 29, further including the step of periodically removing material from the test vessel during the period of evaluation thereof to permit analysis of such removed sample.

37. The method of claim 29 further including determining on a micro-scale, the maximums of the temperature, pressure, rate of temperature rise, and rate of pressure rise which occur in a full-scale pressure vessel containing exothermic reactant materials and including the steps of providing a closed test vessel, introducing the sample of material to be evaluated into said test vessel, establishing conditions in the test vessel effecting initiation of the exothermic reaction, allowing the reaction to continue to substantial completion, and monitoring the maximum temperature and pressure achieved, the rate of temperature rise and the rate of pressure rise during such exothermic reaction.

38. Equipment for micro-scale piloting of full-scale chemical reactions or chemical process conditions to be carried out in pressure vessels, comprising:

a containment unit having an interior surface;
a pilot vessel within the containment unit and having a thin-walled container, with side and bottom walls, for receiving a predetermined pilot proportion of the material(s) to be processed on a full-scale basis and in a manner simulating the full scale reaction or chemical process conditions,
said pilot vessel being spaced from the interior surface of the containment unit;
means for introducing said pilot proportion of the material(s) into the pilot vessel and to effect removal thereof;
a guard energy device within the containment unit and spaced from the pilot vessel and the interior surface of the containment unit respectively for controlling the temperature of the environment immediately surrounding the pilot vessel;
insulating means between the guard energy device and the test vessel;
means for monitoring the temperature conditions existing in the material(s) in the pilot vessel;
means for monitoring the pressure conditions existing within the pilot vessel and the containment unit;
means for introducing fluid or exhausting fluid from the containment unit;
means for comparing the monitored pressures for controlling the introduction or exhaustion of fluid from the containment unit as necessary to maintain substantially isobaric pressure conditions in the pilot vessel and the containment unit; and
means responsive to the monitored temperature conditions and operably connected to the guard energy device for selectively controlling operation thereof to maintain the temperature of the environment around the pilot vessel at a value relative to the sensed temperature of the material(s) in said pilot vessel such that significant heat loss from the material(s) to the environment immediately surrounding the pilot vessel is prevented,
the wall thickness of the pilot vessel being such that a phi factor defined by the thermal mass of the proportion of material(s) in the vessel plus the thermal mass of the pilot vessel divided by the thermal mass of the proportion of such material(s) is not significantly greater than about 1.1.

39. The equipment of claim 38 further including means for introducing said pilot proportion of material(s) and removing the latter from the pilot vessel at a controllable rate on a substantially continuous basis.

40. Equipment as set forth in claim 38, wherein the thickness of said walls is no more than about 0.006 inches.

41. Equipment as set forth in claim 38, wherein the thickness of said walls is no more than about 0.003 inches.

42. Equipment as set forth in claim 38, wherein the thickness of said walls is no more than about 0.001 to about 0.002 inches.

43. The equipment of claim 38 further including thermocouple means extending into the vessel and located to measure the temperature of the material(s) substantially at the central portion thereof.

44. The equipment of claim 38 further including thermocouple means located to measure the temperature of the thermal energy addition means.

45. The equipment of claim 38 further including a conduit communicating with the pilot vessel, said conduit extending through the containment unit and terminating externally of the latter, there being first pressure transducer means connected to said conduit for measuring the fluid pressure therein.

46. The equipment of claim 45 further including second pressure transducer means operable to measure the pressure within the containment unit exteriorly of said pilot vessel.

47. The equipment of claim 46 further including control means operably associated with said first and second pressure transducer means for supplying sufficient fluid to the containment unit to maintain substantially isobaric pressure conditions in the pilot vessel and the containment unit.

48. The equipment of claim 46 further including control means operably associated with said first and second pressure transducer means for supplying sufficient fluid to the containment unit to maintain substantially isobaric pressure conditions in the pilot vessel and the containment unit.

49. Equipment as set forth in claim 38, wherein said pilot vessel is of substantially cylindrical configuration.

50. Equipment as set forth in claim 49, wherein said sidewall is cylindrical in shape and has opposed end walls, one of which is said bottom wall, welded to respective extremities of the sidewall.

51. Equipment as set forth in claim 38, wherein said sidewall is cylindrical and is provided with an internal, longitudinally-extending transversely arcuate baffle projecting from an inner surface of the sidewall and defining a portion of a convolute.

52. Equipment as set forth in claim 38, wherein said containment unit is of generally cylindrical configuration with the vessel substantially coaxial therewith, there being free space within the containment unit above the thermal insulation serving as a fluid chamber for introduction of fluid or exhaustion of fluid therefrom.

53. Equipment as set forth in claim 38, wherein the wall thickness of the pilot vessel is such that the phi factor is in the range of about 1.03 to about 1.1.

54. Equipment as set forth in claim 38, wherein the walls of said pilot vessel are closed against communication with the interior of the containment unit.

55. A method of micro-scale piloting of full-scale chemical reactions or chemical process conditions to be carried out in pressure vessels, said method comprising the steps of:

confining a predetermined pilot proportion of the material(s) to be processed on a full-scale basis in a pilot vessel;

positioning the pilot proportion of material(s) confined in said pilot vessel in a containment zone spaced from the vessel;

providing a controllable supply of guard thermal energy within the containment zone physically and thermally spaced from the pilot vessel for controlling the temperature of the environment immediately surrounding the pilot vessel and the pilot materials therein;

providing insulating means between the pilot vessel and the supply of guard thermal energy;

monitoring the temperature conditions existing in the material(s) in the pilot vessel;

monitoring the pressure conditions existing within the pilot vessel and the containment zone;

selectively providing a supply of pressurized fluid to the containment zone;

effecting selective removal of fluid from the containment zone;

comparing the monitored pressures in the pilot vessel and containment zone for controlling introduction or exhaustion of fluid from the containment zone; and selectively maintaining the temperature of the environment immediately surrounding the pilot vessel at a value relative to the sensed temperature of the material(s) in said pilot vessel to prevent significant heat loss from the material(s) to the environment immediately surrounding the pilot vessel, the thermal mass of the pilot vessel being such that the phi factor defined by the thermal mass of the proportion of pilot material(s) plus the thermal mass of the pilot vessel divided by the thermal mass of the proportion of the pilot material(s) is not significantly greater than about 1.1.

56. A method as set forth in claim 55, wherein is provided the step of selectively removing heat from the proportion of pilot material(s) in the pilot vessel.

* * * * *